(12) United States Patent
Wechlin et al.

(10) Patent No.: US 9,824,805 B2
(45) Date of Patent: Nov. 21, 2017

(54) COIL UNIT AND ELECTRIC VEHICLE

(71) Applicant: CONDUCTIX-WAMPFLER GMBH, Weil am Rhein (DE)

(72) Inventors: Mathias Wechlin, Kandern (DE); Pascal Asselin, Riedisheim (DE); Andrew Green, Malsburg-Marzell (DE)

(73) Assignee: CONDUCTIX-WAMPFLER GMBH, Weil am Rhein (DE)

( * ) Notice: Subject to any disclaimer, the term of this patent is extended or adjusted under 35 U.S.C. 154(b) by 328 days.

(21) Appl. No.: 14/395,152

(22) PCT Filed: Feb. 1, 2013

(86) PCT No.: PCT/EP2013/052016
§ 371 (c)(1),
(2) Date: Oct. 17, 2014

(87) PCT Pub. No.: WO2013/156169
PCT Pub. Date: Oct. 24, 2013

(65) Prior Publication Data
US 2015/0061593 A1 Mar. 5, 2015

(30) Foreign Application Priority Data
Apr. 17, 2012 (DE) .................. 10 2012 103 315

(51) Int. Cl.
*H02J 7/00* (2006.01)
*H02J 7/14* (2006.01)
(Continued)

(52) U.S. Cl.
CPC .............. *H01F 3/00* (2013.01); *B60L 11/182* (2013.01); *Y02T 10/7005* (2013.01);
(Continued)

(58) Field of Classification Search
CPC ........................................................ H02J 7/025
(Continued)

(56) References Cited

U.S. PATENT DOCUMENTS

| 2011/0050382 | A1* | 3/2011 | Baarman | ................... H01F 1/26 336/221 |
| 2012/0187757 | A1 | 7/2012 | Wechlin et al. | |
| 2012/0217819 | A1* | 8/2012 | Yamakawa | ........... B60L 11/182 307/104 |

FOREIGN PATENT DOCUMENTS

| DE | 102007040770 A1 | 3/2009 |
| DE | 102008029200 A1 | 11/2009 |

(Continued)

OTHER PUBLICATIONS

International Search Report dated Nov. 8, 2013 for PCT/EP2013/052016 dated Oct. 31, 2013.
(Continued)

*Primary Examiner* — Edward Tso
*Assistant Examiner* — Ahmed Omar
(74) *Attorney, Agent, or Firm* — Paul D. Bianco; Gary S. Winer; Fleit Gibbons Gutman Bongini & Bianco PL

(57) ABSTRACT

A coil unit for an electric vehicle for the inductive transfer of electrical energy between the coil unit and a stationary charging station. The coil unit includes at least one coil and a flux guide unit for guiding a magnetic flux occurring during operation of the coil. Also disclosed is an electric vehicle having a coil unit for the inductive transfer of electrical energy between a secondary coil of the coil unit and a primary coil of a charging station. The disclosed coil solves the problem of allowing the safe use of the inductive electrical energy transfer in electric vehicles, in particular motor vehicles, by proposing a coil unit, in which the flux guide unit has material weakenings, and an electric vehicle having such a coil unit.

20 Claims, 3 Drawing Sheets

(51) Int. Cl.
*H01F 27/42* (2006.01)
*H01F 3/00* (2006.01)
*B60L 11/18* (2006.01)

(52) U.S. Cl.
CPC .......... *Y02T 10/7072* (2013.01); *Y02T 90/122* (2013.01); *Y02T 90/14* (2013.01)

(58) Field of Classification Search
USPC ........................................................ 320/108
See application file for complete search history.

(56) References Cited

FOREIGN PATENT DOCUMENTS

| | | |
|---|---|---|
| DE | 102009033236 A1 | 1/2011 |
| DE | 102010035634 A1 | 3/2012 |

OTHER PUBLICATIONS

Result of examination report for DE 10 2012 103 315.3 filed Apr. 17, 2012.
English translation of International Preliminary Report on Patentability dated Oct. 21, 2014 for PCT/EP2013/052016, filed Feb. 1, 2014.
Result of examination report for DE 10 2012 103 315.3 filed Apr. 17, 2012 (priority application).
English translation of Written Opinion dated Oct. 17, 2014 for PCT/EP2013/052016 filed Feb. 1, 2013.

\* cited by examiner

COIL UNIT AND ELECTRIC VEHICLE

FIELD OF THE INVENTION

The invention concerns a coil unit and an electric vehicle.

BACKGROUND OF THE INVENTION

In the area of the transfer of inductive energy to movable consumers, for example, electric land vehicles, such as automobiles or trucks, a method is known for charging its vehicle battery via a stationary primary coil of a charging station and a secondary coil located on the bottom of the vehicle. The primary coil is thereby located on or in the traveling lane, for example, on publicly accessible parking lots, charging areas of filling stations, or in the garage of the owner of the vehicle. For the charging operation, the electric vehicle is driven over the primary coil, so that the secondary coil that is located in the vehicle is aligned on the primary coil.

DE 10 2009 033 236 A1 discloses an example for this, in which the secondary coil is located, together with a ferrite plate as a flux guide unit, in a housing on the bottom of an electric vehicle.

DE 10 2008 029 200 A1 discloses a body of a motor vehicle with at least one structure area formed from a plate element. The plate element is located on the bottom of the vehicle body and, in the longitudinal direction, has longitudinal hollow chambers located in the transverse direction of the motor vehicle, next to one another, into which energy storage elements, in particular, accumulator batteries, or other components of an energy storage device are placed. In order to reduce damage or destruction of the energy storage device with the resulting endangerment of the vehicle occupants in case of an accident of the motor vehicle, the energy storage elements, for example, are located only in areas which cannot be deformed excessively in case of an accident, for example, only under the driver's seat, located centrally. In this way, not only the front and rear structures, but also the lateral areas of the passenger compartment, can be deformed for the energy absorption, whereas the energy storage elements are not located in these areas.

DE 10 2007 040 770 A1 discloses a passenger car with a vehicle bottom with a middle tunnel, which extends in the longitudinal direction of the vehicle. The middle tunnel has at least one weak site, where the middle tunnel is deformed under the effect of force caused by an accident after a stress limit has been exceeded. No indication is made there of a coil unit with a flux guide unit for the inductive transfer of electrical energy between the coil unit and a stationary charging station.

DE 10 2010 035 634 A1 discloses a transfer system for charging the traction batteries of an electric vehicle with a coupling device that is attachable thereon, with a transformer part, by means of which the electrical energy can be transferred inductively to a transformer part on the vehicle. The transformer part, which is integrated in the vehicle license plate, has a coupling body made of a flexible plastic material, which surrounds an electrical coil arrangement with a ferrite arrangement, consisting of plate- or yoke-like ferrites, separated from one another. The ferrites, separated from one another, worsen the magnetic flux guidance and thus the coupling between the transformer parts.

With the known coil units, the disadvantage is that the magnetic flux guide unit, as a rule, is made of a massive, rigid, and heavy material, for example, a ferrite plate. Since the coil unit is usually arranged, parallel to the surface, on the bottom of the vehicle and exhibits a great inertia because of its heavy weight, the danger with a rear-end collision is that the flux guide unit will be hurled in the direction of the impact zone and the coil unit will be thereby destroyed and perhaps travel from its anchorage on the bottom of the vehicle and will damage the vehicle and endanger the vehicle occupants as well as persons found outside the vehicle. Since the flux guide unit is also very rigid, as a rule, it will also transfer the impact energy, more or less undiminished, in case of a collision.

SUMMARY OF THE INVENTION

A coil unit and electric unit as disclosed herein make possible the safe use of the inductive electrical energy transfer with electric vehicles, in particular, motor vehicles.

Advantageous developments and appropriate refinements are also disclosed herein.

This goal is attained by the invention with a coil unit with the features of Claim 1 and an electric vehicle with the features of Claim 13. Advantageous developments and appropriate refinements of the invention are indicated in the subclaims.

A coil unit mentioned in the beginning is characterized, in accordance with the invention, in that the flux guide unit exhibits material weaknesses.

Preferably, the material weaknesses can essentially run transverse to the longitudinal direction of the vehicle, where this includes slight deviations by a few centimeters, preferably, by a few millimeters, from the course exactly transverse to the longitudinal direction. Preferably, the material weaknesses can also run essentially concentric to a center of the flux guide unit. Also preferably, the material weaknesses can essentially run in the direction of the magnetic field lines of the magnetic flux guided in the flux guide unit, so that the magnetic flux is hardly impaired in the flux guide unit.

In an advantageous development of the invention, the material weaknesses can be designed, completely or partially, as predetermined breaking points, so that in case of an accident, the impact energy damages or completely destroys the predetermined breaking points.

In an embodiment which is favorable for manufacturing technology, the material weaknesses in the flux guide unit can be provided as grooves. Furthermore, the material weaknesses can be provided on various flat sides of the flux guide unit so they are favorable for operational technology, in order to reduce a deformation of the flux guide unit in a preferred direction.

Preferably, the material weaknesses can run in a plane of the flux guide unit, parallel to the longitudinal direction of the vehicle, inclined—preferably, at an incline to the plane. Thus, parts of the flux guide unit, broken apart in case of an accident, do not collide against one another with their impact edges and in this way, transfer the impact energy, but rather the parts of the flux guide unit, which have broken part, are pushed from the plane against one another—that is, they move past one another.

Preferably, the material weaknesses can be partial or complete breaks of the flux guide unit. In a favorable embodiment, the breaks can be filled, partially or completely, with an adhesive and/or bonding material, so that they are affixed to one another, in their position. The adhesive and/or the bonding material can thereby have ferromagnetic or ferrimagnetic characteristics, so as to make available a good magnetic conductance and thus a good flux guidance in the flux guide unit in spite of the breaks.

An electric vehicle, mentioned in the beginning, is characterized, in accordance with the invention, in that the coil unit is designed as described above and below.

BRIEF DESCRIPTION OF THE DRAWINGS

Embodiment examples of the invention are described in detail, below, with the aid of the appended drawings. The figures show the following.

DETAILED DESCRIPTION OF THE INVENTION

Figure 1:
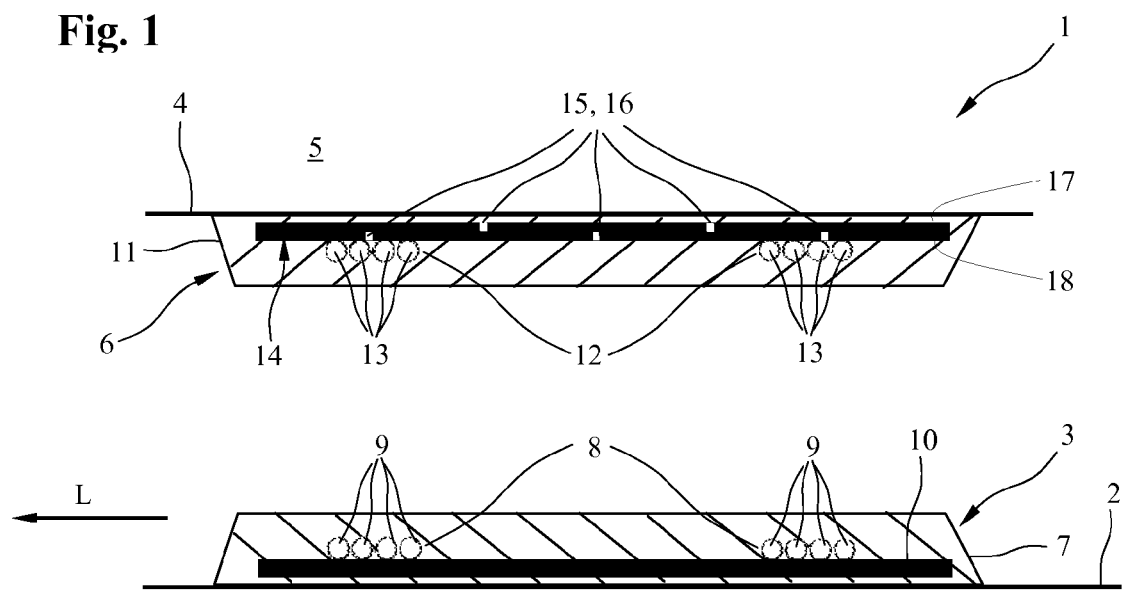
FIG. 1, a lateral sectional view of an inductive energy transfer device with a first embodiment of a coil unit in accordance with the invention.

FIG. 1 shows, schematically, a lateral sectional view of an energy transfer device 1 for the inductive transfer of electrical energy between a primary coil unit 3, installed on a lane bottom 2, which is, in fact, known, and a secondary coil unit 6 in accordance with the invention, placed on a vehicle bottom 4 of an electric vehicle 5. The longitudinal and forward traveling direction of the electric vehicle 5 is marked with an arrow L in FIG. 1.

The primary coil unit 3 thereby comprises, in a manner which is, in fact, known, a primary coil housing 7 with a primary coil 8 located therein, with primary coil windings 9 and a primary coil-flux guide unit 10.

The secondary coil unit 6, which is also only designated, below, as the coil unit 6, has—in a manner which is, in fact, known—a housing 11 with a coil 12, integrated therein, with coil windings 13. In order to attain as good as possible a guidance of the magnetic flux for the inductive energy transfer, the coil unit 6 has a flux guide unit in accordance with the invention, which is also integrated into the housing 11, in the form of a circular ferrite plate 14. Since the material of the ferrite plate 14, which is a good magnetically conducting material, is rather heavy, the ferrite plate 14 forms a massive and rigid object. Since the coil unit 6 is essentially placed parallel to the surface of the vehicle bottom 4 and exhibits a great inertia because of its heavy weight, the danger, in case of a rear-end collision, is that the ferrite plate 14 is hurled in the direction of the impact site and thereby destroys the coil unit 6 and perhaps travels from its anchorage on the vehicle bottom 4. Since the ferrite plate 14 is also very rigid, it also transfers—in the case of an impact—the impact energy in its longitudinal direction L, more or less undiminished.

It is precisely when using the coil unit 6 in electric vehicles that measures must therefore be taken so that in case of an accident, especially a rear-end collision, the ferrite plate 14, if possible, causes no damage or only slight damage, and, if possible, does not pass on undiminished impact energy, but rather, if possible, absorbs a large amount of the impact energy.

In this regard, the invention makes provision so that the ferrite plate 14 has material weaknesses which, in particular, with a rear-end collision, provide for the targeted breakage of the ferrite plate 14, wherein the impact energy is absorbed, and/or parts of the ferrite plate 14 can move against one another so much that the impact energy is not passed on directly, but rather the energy flow is interrupted.

Figure 2:
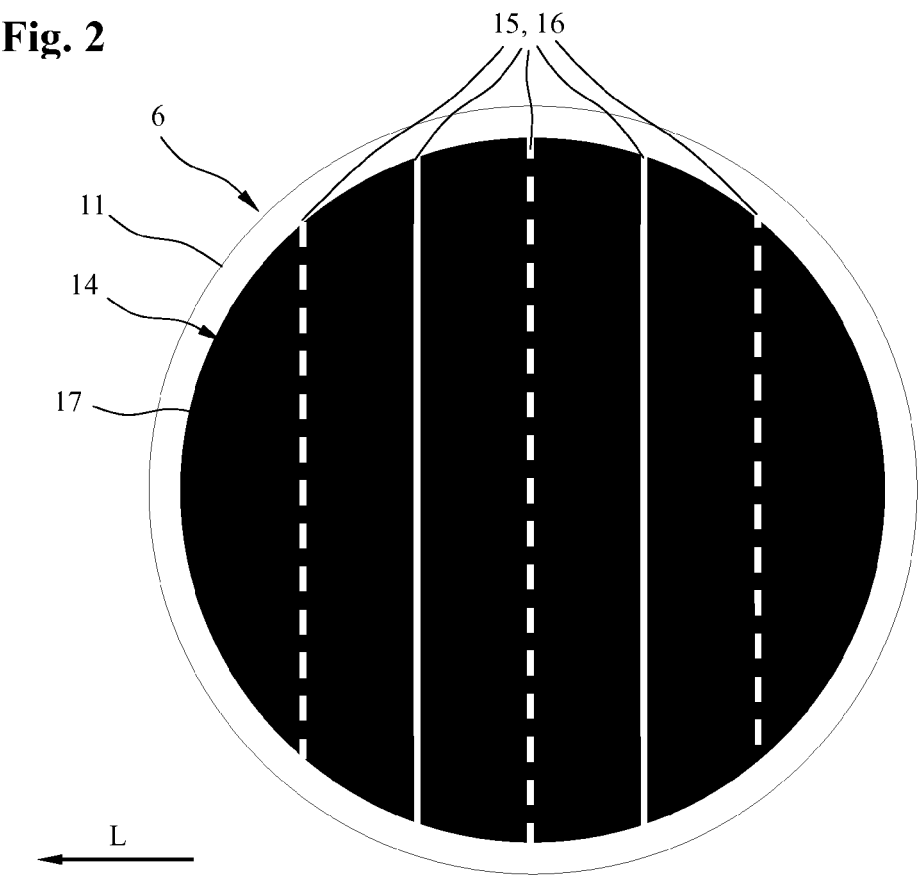
FIG. 2, a schematic top view of the coil unit from FIG. 1.

In the embodiment of the invention shown in FIGS. 1 and 2, the ferrite plate 14 essentially has, as material weaknesses, grooves 15, running transverse to the longitudinal direction L. The grooves 15 or the crosslinks 16 of the ferrite plate 17 remaining there are particularly used, in case of a collision, as predetermined breaking points, where the ferrite plate 14 breaks in a defined manner. As shown in FIGS. 1 and 2, in a preferred embodiment, the grooves 15 are arranged on different flat sides 17, 18 of the ferrite plate 14, so that the ferrite plate 14 easily breaks in the case of a collision, since the frontally introduced impact energy is conducted, at an incline, via the crosslinks 16, wherein a fraction of the impact energy running in the longitudinal direction L then leads to the zigzag breaking of the ferrite plate 14. In this way, not only the direct passing on of the impact energy is reduced, but rather the individual broken parts of the ferrite plate then escape laterally.

Figure 3:
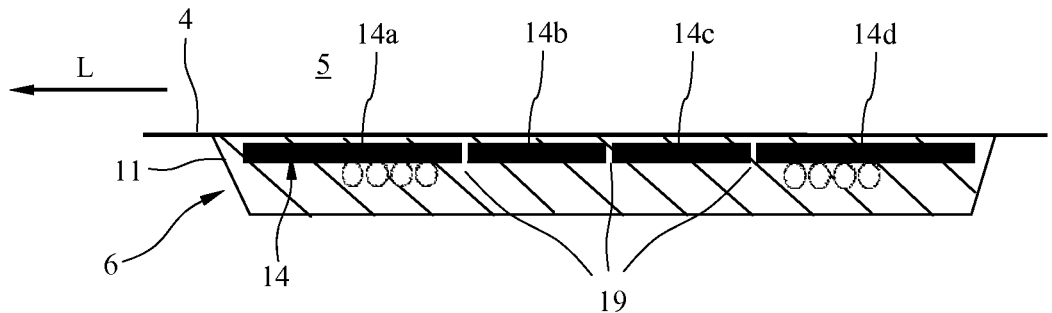
FIG. 3, a lateral sectional view of a second coil unit in accordance with the invention.

In an embodiment of the invention shown in FIG. 3, the ferrite plate 14 has breaks 19, running transverse to the longitudinal direction L—that is, it is subdivided so that the result is four plate parts 14*a-d*. In order to reduce the disadvantages of the breaks 19 for the magnetic flux guidance through the thus produced material break or even the air gap, provision can be advantageously made so that impact sites between adjacent partial elements 14*a-d* are very narrow—that is, for example, the impact sites are pressed against one another by a mechanical holding device. Alternatively, by the casting of the plate parts 14*a-d*, preferably pressed against one another during the casting process, a good magnetically conducting connection can also be attained in the housing 11, and a high magnetic resistance, in particular, an air gap, can be prevented.

Alternatively or additionally, the breaks 19 can also be advantageously filled with an adhesive or bonding material, which is preferably elastic, and in case of a collision, can be easily destroyed, for example, rubber or a soft-elastic plastic. Preferably, the adhesive or the bonding material can have a good magnetic conductance, for example, by the addition of an additive with a good magnetic conductance, such as ferrite powder. In a favorable continuation of the invention, the adhesive or the bonding material can have a poor electric conductance, so as to reduce or completely prevent any eddy currents from appearing in the ferrite plate 14.

Figure 4:
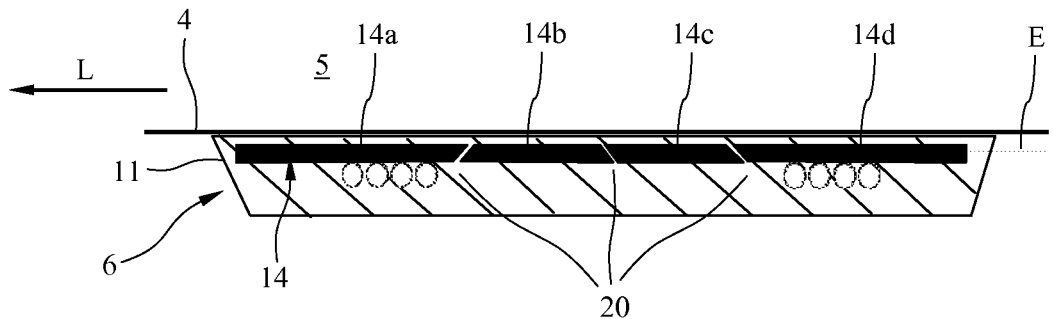
FIG. 4, a lateral sectional view of a third coil unit in accordance with the invention.
Figure 5:
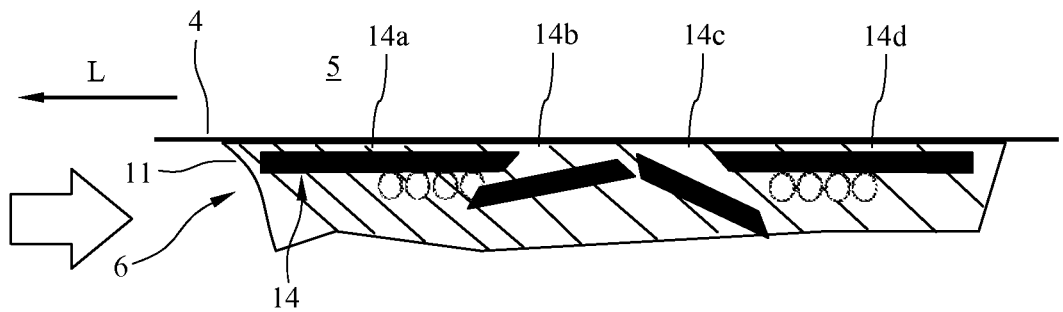
FIG. 5, a lateral sectional view of the coil unit from FIG. 4, after it was destroyed.

In order to further improve the desired break behavior of the ferrite plate 14, the embodiment of the invention shown in FIGS. 4 and 5 provide for the provision of inclined breaks 20, running at an incline to the plane E, instead of the breaks 19 from FIG. 3, in the longitudinal direction L, running perpendicular to the plane E of the ferrite plate 14. These inclined breaks 20 can also be designed in such a way that they do not divide the ferrite plate 14 into individual partial elements 14*a-d*, but rather that the ferrite plate 14 remains, partially or completely, also connected to the inclined breaks 20, via crosslinks similar to the embodiment shown in FIG. 1.

Figure 6:
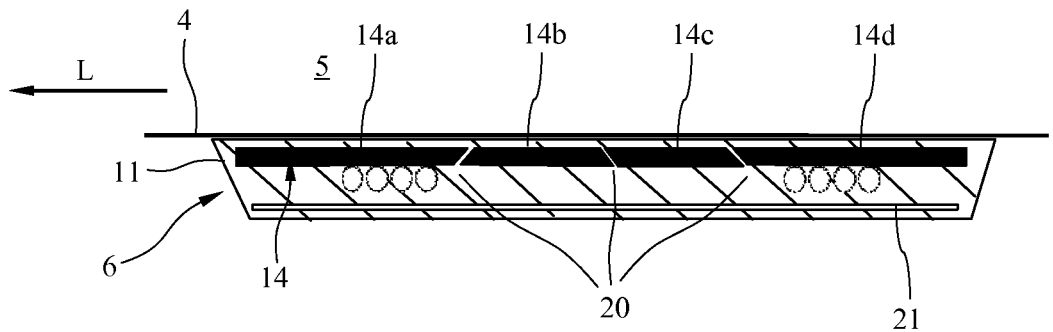
FIG. 6, a lateral sectional view of a fourth coil unit in accordance with the invention.

Preferably, the inclined breaks 20 are so inclined that with a collision of FIG. 6, to the left, indicated in FIG. 6 with the large arrow, the inner plates 14*b* and 14*c*, closer to the center, slide toward the traveling lane 2 and away from the vehicle bottom 4, if they are pushed together by the front most plate part 14*a* and, perhaps, the plate part 14*d* furthest in the rear. This ensures that in the case of an accident, the ferrite plate 14 or one or more of its plate parts 14*a-d* are, if possible, not pushed toward the electric vehicle 5 and, in the worst case, into its passenger space.

In another advantageous development of the invention according to FIG. 6, provision can also be made to incorporate a protection element 21 into the housing 11; this additionally prevents that, in case of destruction, the ferrite plate 14 or its plate parts 14*a-d* can also not get from the housing 11 to the outside of the vehicle 5, so as not to endanger the outside area of the vehicle. Preferably, the protection element 21 can be produced from a material which does not impair the magnetic and/or electric characteristics of the coil unit 6, for example, a preferably flat Kevlar or aramid fabric or paper.

In FIGS. 7*a-c* and 8*a-c*, schematic top views of other coil units, in accordance with the invention, with a circular disk-shaped or square ferrite plate 14 are shown, wherein the invention can also be implemented with other configurations, for example, rectangular, octagonal, polygonal, etc. With these drawings, it is assumed that the forward traveling direction and the longitudinal direction of the electric vehicle 5 point to the left, as defined in FIG. 1.

Figure 7A:
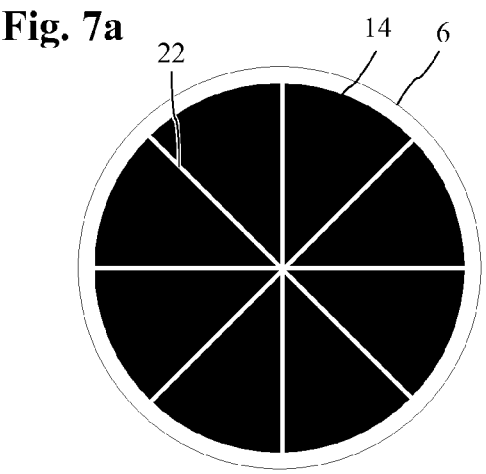
FIGS. 7 *a-c*, schematic top views of other coil units in accordance with the invention, with a circular disk-shaped flux guide unit.
Figure 8A:
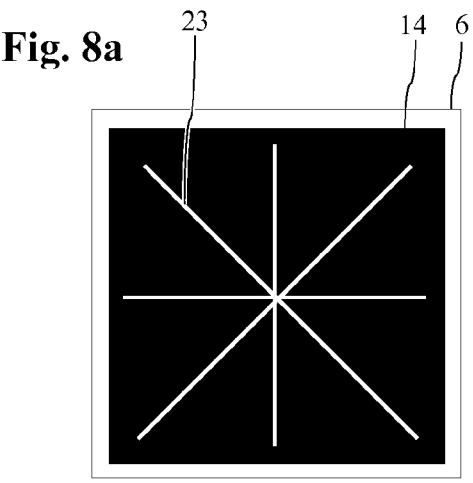
FIGS. 8 *a-c*, schematic top views of other coil units in accordance with the invention, with a square flux guide unit.

In the embodiments according to FIGS. 7*a* and 8*a*, material weaknesses 22 and 23 run in the shape of rays from the center of the ferrite plate 14 to the outside, wherein the material weaknesses 22 completely interrupt the ferrite plate 14, including its thickness, whereas the material weaknesses 23 do not extend to the periphery of the ferrite plate 14. In these embodiments, the material weaknesses 22, 23 essentially run in the main direction of the magnetic flux, which is produced, in the embodiment shown in FIG. 7*a*, by nondepicted coil windings 13, arranged in the form of a spiral on the ferrite plate 14, and, in the embodiment shown in FIG. 8*a*, by nondepicted coil windings 13, arranged in the form of a spiral in the square.

Figure 7B:
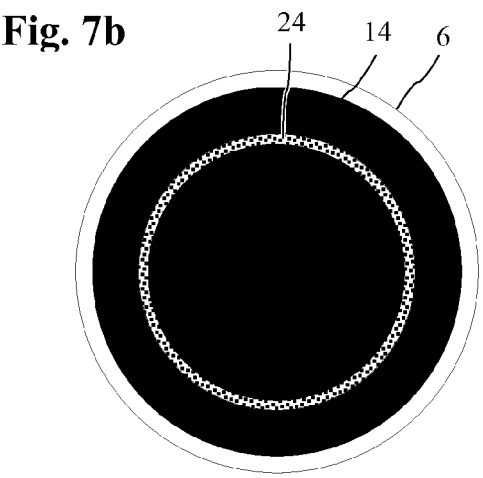
Figure 8B:
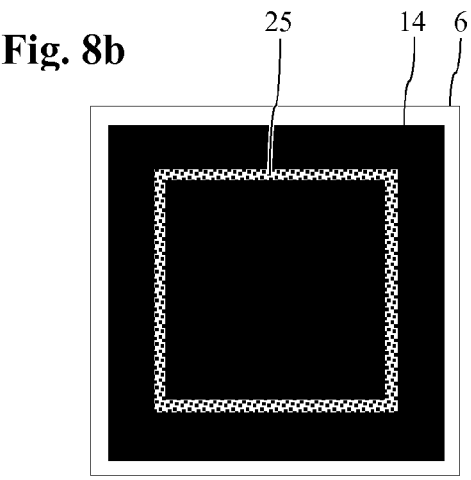

In the embodiments according to FIGS. 7*b* and 8*b*, material weaknesses 24 and 25 run in a circular or square shape—that is, interrupt the main direction of the magnetic flux. If the material weaknesses 24 and 25, as indicated in FIGS. 7*b* and 8*b*, are complete breaks of the ferrite plate 14, then they can be filled with an adhesive or bonding material, described above in FIG. 3, so as to reduce its magnetic resistance. In this way, the break behavior of the ferrite plate 14 can be improved in the case of an inclined or lateral rear-end accident, so that the ferrite plate 14, if possible, breaks in the transverse direction to the rear-end collision.

Figure 7C:
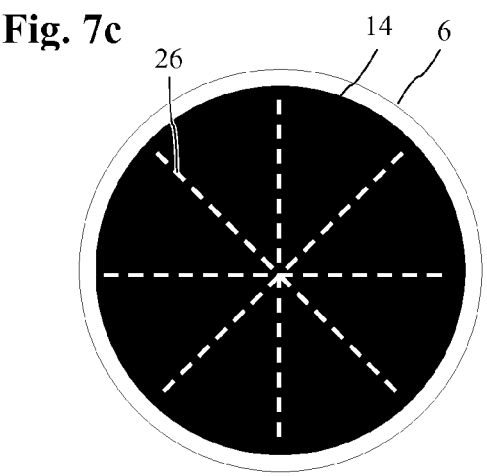

In the embodiment of the invention according to FIG. 7*c*, material weaknesses 26 run in the shape of rays and not entirely to the periphery of the ferrite plate 14, similar to the embodiment shown in FIG. 8*a*, wherein in FIG. 7*c*, the material weaknesses 26 only break the ferrite plate 14 linearly.

Figure 8C:
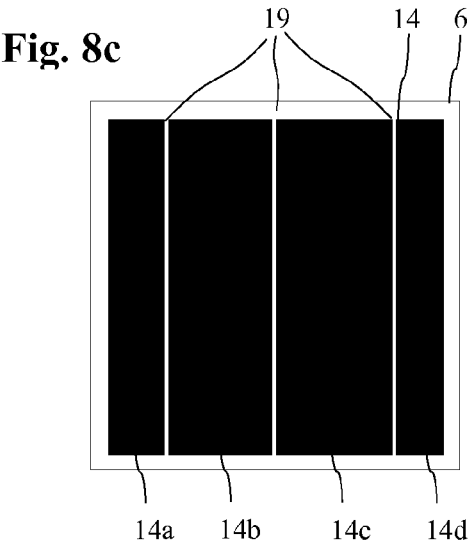

An embodiment of the invention shown in FIG. 8*c* corresponds to the embodiment shown in FIG. 3, with the difference that the ferrite plate 14 is square here and not round.

Instead of the material weaknesses, described above and shown in the figures, in the form of grooves or complete breaks, the material weaknesses can also be designed differently, for example, by holes, stampings, or embossings, extending, completely or partially, through the thickness of the ferrite plate 14. Also, the material weaknesses can be advantageously produced by deliberately caused inhomogeneities of the material forming the ferrite plate 14, so that, for example, the thickness of the ferrite plate 14 remains the same at the points of the desired material weaknesses, but the density of the material is reduced. Also, the different types of material weaknesses can be combined with one another.

LIST OF REFERENCE SYMBOLS

1 Energy transfer device
2 Lane bottom
3 Primary coil unit
4 Bottom of the electric vehicle
5 Electric vehicle
6 Secondary coil unit
7 Primary coil housing
8 Primary coil
9 Primary coil windings of the primary coil
10 Flux guide unit of the primary coil unit
11 Housing of the secondary coil
12 Secondary coil
13 Coil windings of the secondary coil unit
14 Ferrite plate as a flux guide unit of the secondary coil unit
15 Grooves
16 Crosslinks
17 Upper, inner flat side
18 Lower, outer flat side
19 Breaks
20 Inclined breaks
21 Protection element
22 Ray-shaped material weaknesses
23 Ray-shaped material weaknesses
24 Circular material weaknesses
25 Square-shaped material weaknesses
26 Ray-shaped, linear material weaknesses

The invention claimed is:

1. A device for inductive transfer of electrical energy between an electric vehicle and a charging coil, comprising:
   at least one coil; and
   a flux guide unit for guidance of a magnetic flux appearing during the operation of the coil, wherein the flux guide unit has material weaknesses configured, completely or partially, as predetermined breaking points, the material weaknesses extending in a plane of the flux guide unit that is parallel to the longitudinal direction of the vehicle and at an inclined angle relative to the plane.

2. The device according to claim 1, wherein the material weaknesses essentially run transverse to the longitudinal direction of the vehicle.

3. The device according to claim 1, wherein the material weaknesses essentially run concentric to a center of the flux guide unit.

4. The device according to claim 1, wherein the material weaknesses essentially run in the direction of the magnetic field lines of the magnetic flux guided in the flux guide unit.

5. The device according to claim 1, wherein the material weaknesses in the flux guide unit are provided grooves.

6. The device according to claim 1, wherein the material weaknesses are provided on different flat sides of the flux guide unit.

7. The device according to claim 1, wherein the material weaknesses are alternatingly provided on the different flat sides of the flux guide unit.

8. The device according to claim 1, wherein the material weaknesses are partial or complete breaks of the flux guide unit.

9. The device according to claim 1, wherein the breaks are, partially or completely, filled with an adhesive and/or bonding material.

10. The device according to claim 9, wherein the adhesive and/or the bonding material has ferromagnetic or ferrimagnetic characteristics.

11. Electric vehicle with a coil unit for inductive transfer of electrical energy between a secondary coil of the coil unit and a primary coil of a charging station, wherein the coil unit is designed in accordance with claim 1.

12. A device for inductive transfer of electrical energy between an electric vehicle and a stationary charging station, comprising:
   at least one coil; and
   a flux guide unit positioned proximate the coil for guidance of a magnetic flux arising during the operation of the coil, the flux guide unit having a plurality of predetermined material weaknesses as paths extending along the flux guide unit, the paths disposed at an angle with respect to a planar surface of the flux guide unit, each path formed as at least one of a gap or weaker material relative to adjacent material of the flux guide unit, the paths sized and dimensioned to cause the flux guide unit to break free a substantial portion of the flux guide that is bounded by at least one of the weakened paths and to to guide the portion along the angled path to eject the portion away from a passenger compartment of the electric vehicle during an impact accident of the electrical vehicle to thereby reduce movement inertia of the flux guide and to thereby safeguard passengers of the electric vehicle from intrusion of the flux guide unit into the passenger compartment.

13. The device of claim 12, the predetermined material weaknesses extending along a direction transverse to the longitudinal direction of the vehicle as defined when the device is installed in the electric vehicle.

14. The device of claim 12, the material weaknesses in the flux guide unit having the form of grooves formed in the surface of the magnetic flux unit.

15. The device of claim 12, the material weaknesses being provided on upper and lower surfaces of the magnetic flux unit as defined when the magnetic flux unit is installed in the electric vehicle.

16. The device of claim 12, the predetermined material weaknesses extending into at least one of the upper and lower surfaces of the magnetic flux unit as defined when the magnetic flux unit is installed in the electric vehicle, the weaknesses extending into the at least one upper and lower surface at an incline with respect to the respective upper or lower surface.

17. The device of claim 12, the predetermined material weaknesses formed as gaps between portions of the magnetic flux unit, the gaps at least one of partially or completely filled with at least one of an adhesive and bonding material that has at least one of ferromagnetic or ferrimagnetic characteristics.

18. A method of fabricating a flux guide unit for guidance of a magnetic flux during the operation of a coil aboard a moving electric vehicle obtaining power from a stationary power source, the method comprising:
   forming a plurality of predetermined material weakness as paths extending along the flux guide unit, each path formed as at least one of a gap or weaker material relative to adjacent material of the flux guide unit, the paths sized and dimensioned and disposed at an angle relative to a longitudinal plane of the flux guide unit surface to cause the flux guide unit to break into portions and to cause at least one of the portions to break free and to be guided by the angled path to be thereby ejected in a direction away from the passenger compartment during an impact accident of the electrical vehicle to thereby reduce movement inertia of the flux guide and avoid intrusion of portions of the flux guide unit into the passenger compartment.

19. The device of claim 1, a section of the flux guide defined by the material weaknesses on opposite sides of the section, the angles inclined to guide the section in a direction away from a passenger compartment of the electric vehicle when one or more adjacent portions of the flux guide are pushed against the section during an accident of the vehicle.

20. The device of claim 19, further including a sheet positioned adjacent to the section, the sheet sized and configured to resist movement of the section away from the vehicle during the accident of the vehicle.

* * * * *

UNITED STATES PATENT AND TRADEMARK OFFICE
CERTIFICATE OF CORRECTION

| | |
|---|---|
| PATENT NO. | : 9,824,805 B2 |
| APPLICATION NO. | : 14/395152 |
| DATED | : November 21, 2017 |
| INVENTOR(S) | : Wechlin et al. |

It is certified that error appears in the above-identified patent and that said Letters Patent is hereby corrected as shown below:

On the Title Page

Item (72) Inventors should read:
(72) Inventors: Mathias Wechlin, Kandern (DE);
　　　　　　　Pascal Asselin, Riedisheim (FR);
　　　　　　　Andrew Green, Malsburg-Marzell (DE)

Signed and Sealed this
Twenty-second Day of May, 2018

Andrei Iancu
*Director of the United States Patent and Trademark Office*